US007783651B2

(12) United States Patent
Muscarella

(10) Patent No.: US 7,783,651 B2
(45) Date of Patent: Aug. 24, 2010

(54) BASE TREE NODE INFRASTRUCTURE

(75) Inventor: Fabrizio Muscarella, Mannheim (DE)

(73) Assignee: SAP AG, Walldorf (DE)

( * ) Notice: Subject to any disclaimer, the term of this patent is extended or adjusted under 35 U.S.C. 154(b) by 335 days.

(21) Appl. No.: 11/752,847

(22) Filed: May 23, 2007

(65) Prior Publication Data
US 2008/0294654 A1 Nov. 27, 2008

(51) Int. Cl.
G06F 7/00 (2006.01)
G06F 17/30 (2006.01)
(52) U.S. Cl. .................... 707/756; 707/793
(58) Field of Classification Search .......... 707/101, 707/103 R, 10, 100, 10 R; 709/201
See application file for complete search history.

(56) References Cited

U.S. PATENT DOCUMENTS

| | | | | |
|---|---|---|---|---|
| 4,466,065 A | * | 8/1984 | Advani et al. ................. | 710/54 |
| 5,781,906 A | * | 7/1998 | Aggarwal et al. ............. | 707/102 |
| 5,987,247 A | * | 11/1999 | Lau ............................. | 717/100 |
| 6,223,145 B1 | * | 4/2001 | Hearst ......................... | 703/22 |
| 6,314,424 B1 | * | 11/2001 | Kaczmarski et al. .......... | 707/10 |
| 6,381,640 B1 | * | 4/2002 | Beck et al. .................... | 709/223 |
| 6,393,427 B1 | * | 5/2002 | Vu et al. ....................... | 707/101 |
| 6,457,065 B1 | * | 9/2002 | Rich et al. .................... | 719/328 |
| 6,662,189 B2 | * | 12/2003 | Oyanagi et al. ............... | 707/102 |
| 6,760,733 B1 | * | 7/2004 | Komine et al. ............... | 707/102 |
| 6,944,830 B2 | * | 9/2005 | Card et al. .................... | 715/853 |
| 7,076,742 B1 | * | 7/2006 | Thorn et al. .................. | 715/853 |
| 7,346,656 B2 | * | 3/2008 | Worthen ....................... | 709/204 |
| 7,523,126 B2 | * | 4/2009 | Rivette et al. ................. | 707/102 |

OTHER PUBLICATIONS

Post, LL & Sydi, JJ, Dynamically Configurable User Interface for the manipulation of Data Objects, Mar. 1, 1994, IP.com, vol. 37 No. 03.*
Blakely-Fogel, D & Carver, D, Generic Database Interface, Mar. 17, 2005, IP.com, 90A064051.*
IBM, Simple Data Exchange Model and Interface Framework, Mar. 8, 2005, IP.com IPCOM000099002D.*
Knapman, JM, Generating Specific Server Programs in Distributed Object-Oriented Customer Information Control System, Jan. 1, 1995, IP.com, vol. 38 No. 01.*
McGarraham, JR & Puryear, LC, Manage and Store Database Data Definition or Data Model as User Data, Sep. 1, 1995, IP.com, vol. 38 No. 09.*
IBM, A Method to provide a Portability Support for an Application Server in a Distributed Object Environment, Jun. 21, 2003, IPCOM000016094D.*

* cited by examiner

*Primary Examiner*—Yicun Wu
*Assistant Examiner*—Pavan Mamillapalli
(74) *Attorney, Agent, or Firm*—Blakely Sokoloff Taylor & Zafman, LLP

(57) ABSTRACT

Methods and apparatuses enable generation of a tree structure that integrates the objects of the tree with access interfaces. A tree worker receives an indication of a base node object of a tree, and a list of children related to the base node object. In response to receiving the indication of the base node object and the list of children, the tree worker can generate a tree structure having the object and its related (children) objects.

18 Claims, 4 Drawing Sheets

BASE TREE NODE INFRASTRUCTURE

FIELD

Embodiments of the invention relate to remote interfaces, and more particularly to generating a distributed object tree that integrates with a remote interface.

BACKGROUND

The increased use of technology in jobs increases the significance of data access to employees in a wide variety of professions and industries. Data access is typically obtained via computing devices, which are often separate or remote from a device on which the data is stored. The computing devices can thus be considered to have remote interfaces for accessing data. In an enterprise or company, data can be stored in various locations and accessed from various locations within the enterprise. Access interfaces to the data are designed to allow an enterprise user to access the data remotely. The access interfaces include a user interface that provides one or more mechanisms for a user to access data, and one or more data access interfaces that receive data access requests from the user interface.

In traditional systems, data access interfaces have been customized by developers for a particular user interface. Customizing the data access for a particular user interface results in a significant amount of duplicated effort and additional costs. Additionally, data access mechanisms that are tied to a specific user interface require a rebuild of the entire backend data access when porting the functionality to a different user interface.

One function of a user interface can be to access object trees, which include an object and its related objects. Traditionally, building an object tree required a developer to have specific knowledge of the user interface to build the tree. The developer traditionally had to write several operations to implement the tree and provide its representation to the user interface. Thus, the developer was required to have specific knowledge of the interface, and each solution was dependent on the interfaces employed in the system. The developer had to write all code for integration, which required the developer to manually create and insert each object into the tree. Thus, when a user attempted to access a tree, the tree was available because the developer had built the tree. As with the general discussion above with regard to remote user interfaces, such requirements resulted in significant costs in terms of time and effort, and porting the solution was difficult at best, and at worst porting required nearly an entire redevelopment of the system.

BRIEF DESCRIPTION OF THE DRAWING

The following description includes discussion of a figure having illustrations given by way of example of implementations of embodiments of the invention. The drawing should be understood by way of example, and not by way of limitation.

DETAILED DESCRIPTION

Figure 1:
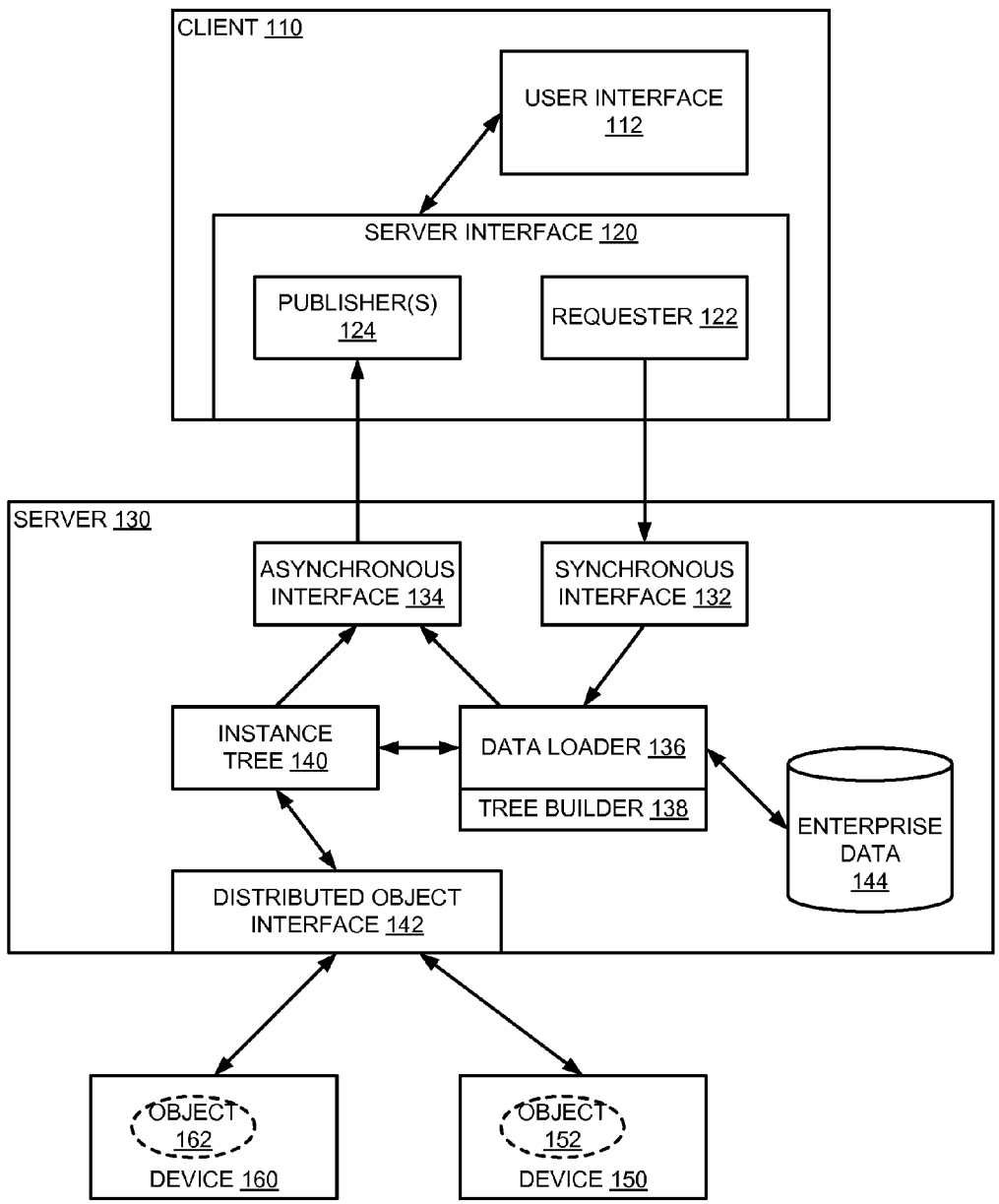
FIG. 1 is a block diagram of an embodiment of a system having a server with an asynchronous data loader.

As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive. Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

Methods and apparatuses enable generation of a tree that integrates with access interfaces. In one embodiment, data access mechanisms provide business logic and data access interfaces that operate asynchronously with respect to the requesting user interface (UI). The data access is performed asynchronously with respect to the data access request and a UI update. In one embodiment, one or more publisher interfaces are provided to allow the data access mechanisms to directly control the UI in an asynchronous manner. The data access mechanisms generate a distributed object tree in response to receiving an indication of a distributed object and its related objects. The generation of the distributed object tree can be accomplished by the system via the indication of the distributed object and its related objects, and the developer does not need to custom integrate the objects into the tree. Additionally, the system allows for portability by having the data access mechanisms interact with one or more publisher modules, rather than needing specific methods for the UI itself.

In one embodiment, the tree is built via the instantiation of a distributed object tree class that includes logic and/or functionality to interface with the publishers. The interface functionality can then be automatically inherited. The interface functionality can include the functionality to implement a representation of the distributed object and its associated tree in the UI, which eliminates the need for the developer to develop such functionality. In one embodiment, update and status functionality is included within the data access mechanisms, and may be included within the distributed object tree class itself. Thus, update and refresh of the representation in the UI can be accomplished asynchronously and automatically as data access occurs, without the developer needing to develop specific routines for such functionality to occur.

In one embodiment, the system can be based on a model-view-controller (MVC) framework. The model or data/data access is represented in a generic manner. In one embodiment, a base tree node class is defined as the model component, where the class represents a generic graph. Every action or event processed on the data model (e.g., deleting an element or adding a tree of children) can be provided to the view via the controller components. In such an implementation, the (data and status) publishers represent the controller components. The view or the user interface can be directly managed by the model using the publisher interfaces. Thus, actions on the data model can be automatically updated in the view via the controllers (the publisher interfaces). Thus, the implementation effort for showing the data in a different MVC framework is reduced to a reimplementation of the publisher interface(s), without requiring rewriting the other MVC interface components.

In one embodiment, the tree generation as described herein works in conjunction with methods and apparatuses that enable a remote data interface to provide data asynchronously with respect to the data access request. Such asynchronous remote data interfacing is described generally, followed by a more particular description of the figure. In one embodiment, the remote data interface is modularized and not specific to a particular user interface, enabling more efficient porting to different user interfaces. A client device includes an interface to a backend system, which backend system may include one or more enterprise servers. The enterprise server may in turn be connected to one or more data repositories, and/or other client devices. In a typical enterprise environment, data objects may be distributed throughout the enterprise. Distributed objects include any type of data objects that are or may be distributed through the enterprise system. As referred to herein, a distributed object is an object that can be stored in one location of the enterprise that may be separate from the storage location of another object with which it has a relationship. An object relationship may be any type of relationship or dependency that enables the objects to work together, or be used in conjunction with each other. An example may be configuration data stored on multiple different machines within an enterprise network.

A request for access to data is generated through a user interface, which is passed to a data access interface of a remote or separate device. Data access interface mechanisms as described herein enable asynchronous operation of the data access with respect to the request. A request to perform a function with respect to a distributed object tree is received at the data access interface. The data access interface queues the request and replies to the requesting entity. In one embodiment, the reply is provided or sent synchronously with respect to the request. That is, the request is received and queued, and after queuing the request, the reply is sent. Typically, such an interaction occurs quickly enough that although synchronous, it would likely be imperceptible to a user.

The request is for the performance of a function or operation. Note that it is not uncommon to use the expressions "function" and "operation" as interchangeable. However, simply for purposes of simplicity in description herein, and not by way of limitation, the expression "operation" refers to an atomic element of execution by a processing system, and "function" refers to one or more operations. An atomic element of execution refers to a single executable expression in a programming language of choice, which may itself be compiled to multiple assembly/machine-code instructions. Thus, although operation may commonly refer to one or more operations in normal usage, "function" will refer to one or more operations, which refer to single executable expressions of a high-level programming language. The requested function is queued in an execution queue. In one embodiment, the function is separated into its constituent operations, and each operation is queued for execution. In one embodiment, the operations are queued in an execution order, or the order in which they should be executed. Queuing the operations in execution order may, for example, include placing the operations in execution order and placing them in a first-in first-out (FIFO) queue. Other forms of execution scheduling may be used.

The operations are executed in a background process, which may include opening a background thread for each operation. In one embodiment, the queuing of the operations occurs in a main thread, and the execution of the operations occurs in background threads generated by the main thread. A tree worker node or tree builder or equivalent module may execute one or more of the operations. In one embodiment, execution of one or more operations includes the accessing of a distributed object interface, which may, for example, be a web service interface that accesses a distributed object. As the operation(s) are executed, the background processes can report to one or more asynchronous update modules that interface with the user interface from which the request was generated. The update modules asynchronously provide data and/or status information to the user interface as operations are executed. Thus, the user interface may continue to be active with other tasks, and the data and status are provided as other tasks are being performed within the user interface. The data access mechanisms can provide true asynchronous operation as contrasted to the pseudo-asynchronous operation of traditional systems.

Consider an enterprise system having distributed objects, and having multiple instances of a user interface representing a connection to the backend enterprise system. For example, consider an enterprise system available from SAP AG of Walldorf, Germany, with a user interface, referred to as SAP-Instance. Suppose a function referred to as UpgradeASStatus were created, which would perform the following operations: UpgradeABAPStatus, UpgradeJ2EEStatus, and UpgradeTR-EXStatus. Passing the function UpgradeASStatus to a data loader of the backend system can result in having each of UpgradeABAPStatus, UpgradeJ2EEStatus, and UpgradeTR-EXStatus queued and asynchronously executed by the backend system (via the data loader). In one embodiment, the data loader queues an operation and generates an Execute method of the operation, which will consequently load and execute the operation. As the operation is executed, it may generate one or more outputs to a data publisher and/or a status publisher, which can provide the data to the SAPInstance as the data is available, which is asynchronous to the passing of the UpgradeASStatus.

FIG. 1 is a block diagram of an embodiment of a system having a server with an asynchronous data loader. System 100 represents an enterprise system, which may include any number of client devices, server, distributed objects, etc. Specifically depicted are client 110, server 130, and devices 150 and 160, which include objects 152 and 162, respectively. Client 110 represents a network device such as a desktop or laptop computer, a server, a handheld computing device, or other computing device that may access an enterprise network. Server 130 represents an enterprise server, which may be a standalone hardware device, or be an aggregation of hardware resources under a management system. For example, a rack of hardware equipment may be apportioned among multiple servers that execute on the hardware resources, each management system treating the allocated hardware resources as an integral device. Devices 150 and 160 may be data repositories (e.g., storage) on the enterprise, as well as other client devices, servers, etc. Devices 150 and 160 may even be the same physical and/or logical device in the enterprise.

Client 110 includes user interface 112 that enables interaction by a user with client 110. The user provides input into user interface 112, which generates one or more requests for functions to be executed. User interface 112 may include graphical and/or textual components, and may include a graphical user interface (GUI), and/or a command line interface (CLI). In one embodiment, user interface 112 provides a representation of an enterprise access instance. User interface 112 may generate the requests, or alternatively, provide the raw input data (e.g., text, clicks, etc., from a user) to server interface 120, which then generates the requests for one or more functions to be performed. In one embodiment, server interface 120 represents hardware and software that enables client 110 to access an enterprise backend. In another embodiment, server interface 120 represents the software system that provides a user interface to the enterprise. Server interface 120 may include one or more drivers or software modules, as well as ports and physical connections. In one embodiment, server interface 120 includes requester 122 and one or more publishers 124.

Requester 122 provides a communication mechanism with server 130. In one embodiment, requester 122 interacts synchronously with server 130, although asynchronous functionality could be implemented. Publisher 124 represents one or more components that provide data and/or status information into user interface 112 for display. In one embodiment, server interface 120 and user interface 112 represent components of a SWING GUI implementation. Swing is a JAVA GUI toolkit that includes GUI widgets that enable the building of user interfaces. JAVA and SWING are available from SUN MICROSYSTEMS, Inc., of Santa Clara, Calif. All marks used herein are the property of their respective owners. In another embodiment, server interface 120 and user interface 112 represent components of a STANDARD WIDGET TOOLKIT (SWT) available from ECLIPSE FOUNDATION of Ottawa, Ontario, Canada. Similarly to Swing, SWT enables the building of user interfaces.

A request is sent to server 130 from requester 122 and received at synchronous interface 132. In response to receiving the request, synchronous interface 132 provides the request to data loader 136. In one embodiment, the request represents a function call that is received at synchronous interface 132, and which triggers the performance of one or more operations. Data loader 136 queues the function and provides a reply via synchronous interface 132 to requester 122. When a request is generated, requester 122 may obtain control of user interface 112, which would prevent other tasks being performed by the user in the user interface. After receiving the reply that the function was received, requester 122 may release control of the user interface, allowing other tasks to be performed in the user interface while waiting for the requested function to be performed.

In one embodiment, data loader 136 can access asynchronous interface 134 to provide status information to user interface 112. Status information can indicate a length of time the execution of the operations are expected to take, what percentage of work has been executed, etc. Such information can be sent to client 110 via asynchronous interface 134, and displayed through publisher 124. Data loader 136 is also coupled to tree builder 138, which represents a worker node that can execute the operations queued by data loader 136. In one embodiment, data loader 136 initiates an execute method of a queued operation, which is then executed by tree builder 138. Tree builder 138 accesses one or more distributed objects 152, 162 through distributed object interface 142. In one embodiment, tree builder 138 receives an indication of a distributed object and builds instance tree 140 based on the distributed object and its children objects. The children can be discovered, for example, through receiving a list of children with the request, or via a lookup method, or accessing the object or enterprise data.

Data loader 136 and/or tree builder 138 initiate access to distributed objects, which are accessed. Data loader 136 and/or tree builder 138 initiate having the requested operations performed, which may include reading data, writing data, changing an attribute of the data object, etc. Any of a number of directory operations may be performed, for example, selecting a directory item (gaining access to the underlying data object), displaying details of a data object (reading the data object), displaying the details of a directory (reading multiple data objects, including relationships between the objects), etc. Data is returned to asynchronous interface 134 upon completion of execution of an operation, which data can then be displayed in user interface 112 via publisher 124.

In one embodiment, server 130 includes, or has access to enterprise data 144, which may include one or more objects (which may be base tree nodes). In one embodiment, enterprise data 144 includes relational information and can provide information regarding which objects are related or have relationships. Instance tree 140 represents the distributed object tree having an instance node or base tree node, with its children or related objects. The requested operations are performed on the distributed objects, and the distributed object tree structure can be changed in accordance with the operations performed. Thus, instance tree 140 can be a dynamic structure that represents the dynamic state of the underlying distributed objects, which can be changed in response to operations performed on the objects. Instance tree 140 is coupled to asynchronous interface 134, and sends data to asynchronous interface 134, which is then sent to publisher 124 of client 110.

Figure 2:
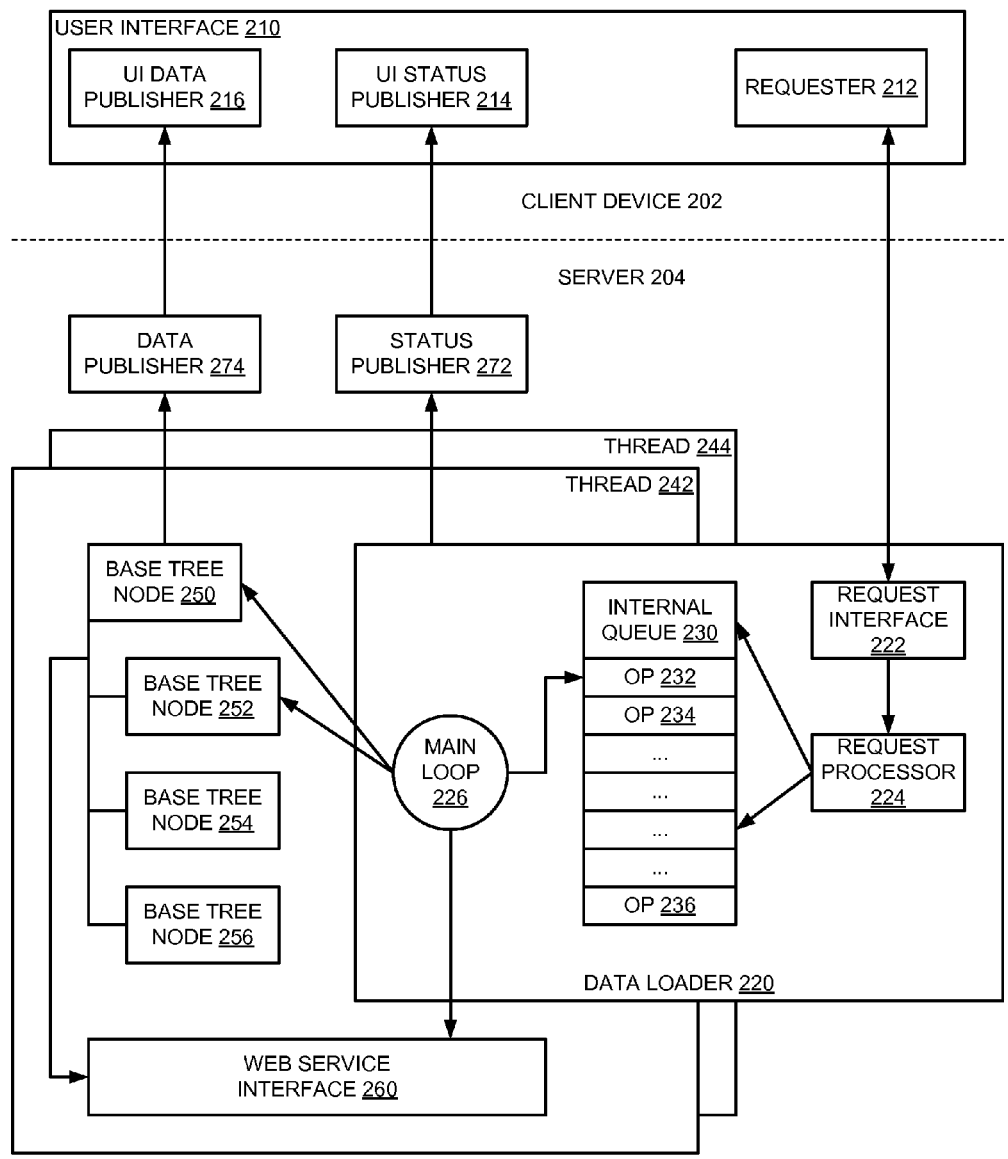
FIG. 2 is a block diagram of an embodiment of a system that provides asynchronous status and data updates to a remote user interface.

FIG. 2 is a block diagram of an embodiment of a system that provides asynchronous status and data updates to a remote user interface. System 200 represents a system comparable to system 100 of FIG. 1. System 200 includes client device 202 and server 204, which are examples of client 110 and server 130, respectively, of FIG. 1. Client device 202 represents a device that remotely accesses enterprise data, or accesses data that is stored in the enterprise separately from the device itself. Server 204 processes and responds to the requests of client device 202.

Client device 202 includes user interface (UI) 210. In one embodiment, UI 210 is implemented as a Swing application. Alternatively, UI 210 could be implemented as an SWT application, or some other application based on another toolkit or technology. UI 210 may include any number of components, among which may be requester 212, UI status publisher 214, and UI data publisher 216. Requester 212 represents a component from which a request for access to a distributed object may be generated. For example, requester 212 may be a frame, tree, table, etc. Requester 212 requests a function to be performed on a distributed object tree. In one embodiment, requesting the function is performed by invoking a function, such as Start, Stop, LoadChildren, etc.

The request is sent to data loader 220 of server 204. Request interface 222 of data loader 220 receives the request. Request interface 222 represents a communication channel, which may include hardware components of a communication link or a combination of hardware and software components (e.g., the connector, a port, a network interface circuit, a signal driver, etc.). Request interface 222 enables data loader 220 to communicate with user interface 210. The request is passed from request interface 222 to request processor 224, which may be separate from, or combined with, request interface 222. Request processor 224 may perform any of a number of tasks on the request, including verifying the format of the request, error checking, etc. In one embodiment, request processor 224 determines from the request one or more operations to execute to perform the function. For example, request processor 224 may generate a StartOperation, StopOperation, LoadOperation, etc., in response to receiving the function request. In one embodiment, determining the operations includes looking up which operations provide particular functions. Generally, a certain number of functions will be defined that can produce results for user interface 210. A request for an undefined function may generate an error. A function can be defined as having multiple operations to perform to achieve the result. The function, or its constituent elements (operations), is/are queued in internal queue 230 of data loader 220.

In one embodiment, request processor 224 receives information related to building the tree of base tree node 250. For example, requester 212 may indicate base tree nodes 252-256 (e.g., via sending a list), indicating such distributed objects as having a relationship with base tree node 250, and belonging in the tree. In one embodiment, request processor 224 loads tree information and/or a list of child nodes, such as from an enterprise database, which identify the elements of the distributed object tree.

Request processor 224 may invoke an Add(Operation) or similar method to queue an operation in internal queue 230. Such an invocation is represented by the arrow pointing to the label block of internal queue 230. Internal queue 230 may store operations in any order. Typically, a particular order is provided to the queue, which may be execution order and/or FIFO, and/or some other order. Many types of queuing and dequeuing/scheduling techniques are known and will not be explained herein. The other arrow from request processor 224 to internal queue 230 represents any of a number of other methods that may be performed with respect to a queued operation. For example, in one embodiment, data loader 220 tracks each queued operation (ops 232-236) and determines when to update a status of the operation to user interface 210. Thus, a Notify( ) method or other method, or some equivalent, can be performed.

Main loop 226 represents a main loop or logical flow of execution of data loader 220. Data loader 220 includes a flow control mechanism, which may be a main software loop that is performed, or other flow control, whether hardware or software. Main loop 226 may determine that an operation exists in internal queue 230, dequeue the operation, and cause it to be executed. The operation is executed in a background process, which may be a background thread. The background thread can be dedicated to the execution of one or more operations, or a background thread can be more general. In one embodiment, data loader 220 initiates execution of an operation in an existing, available thread. In another embodiment, data loader 220 invokes a new thread for one or more operations. Thus, executing the operation or initiating execution of the operation may include determining what thread in which to execute the operation. Data loader 220 may initiate execution of an operation (for example, op 232, which is pointed to by a scheduling mechanism) in thread 242 or thread 244. In one embodiment, a thread is initiated and exists for each instance of an enterprise data access application (e.g., SAPInstance as referred to above). Thus, thread 242 may be dedicated to operations on base tree node 250 that represents the instance, and thread 244 may be dedicated to operations on a different instance. Note that base tree node 250 may be part of a larger tree.

As mentioned above, base tree node 250 represents an instance of a data access application. In one embodiment, the tree of base tree node 250 is generated by data loader 220 in conjunction with performing one or more operations. Base tree node 250 has relationships with base tree nodes 252-256. For example, base tree nodes 252-256 can be children of base tree node 250. Each of the base tree nodes has a number of methods that are associated with the respective base tree node, and may be invoked in conjunction with implementing the operation. Base tree node 250 represents an node of an object tree, with the other objects related to base tree node 250 being represented underneath base tree node 250. One or more nodes of the tree may access a web service via web service interface 260. Web service interface 260 provides functionality for monitoring and/or controlling the instance represented by base tree node 250. An example web service interface could be SAPControlInterface available for SAP instances. Alternatively, web service interfaces available from ADOBE SYSTEMS INCORPORATED of San Jose, Calif., INTERNATIONAL BUSINESS MACHINES (IBM) CORPORATION of Armonk, N.Y., or others. The web service interface is dependent on the type of instance and/or data that is being retrieved.

Note that main loop 226 is illustrated with multiple arrows pointing to different components of FIG. 2. Each arrow represents a possible scenario or implementation detail associated with the interaction of data loader 220 with the background processes. For example, one arrow points to base tree node 250, which represents the instance in question. Data loader 220 may initiate an action in the instance, which may then independently act, either through accessing web service interface 260 and/or initiating an action in a related base tree node 252-256. As another example, data loader 220 can initiate an action in one of the related or associated base tree nodes, such as base tree node 252. Such an action can affect the distributed object tree. Initiating the action in base tree node 252 can also trigger an access to web service interface 260. As another example, the last arrow points to web service interface 260, indicating that data loader 220 may directly initiate an action in web service interface 260 to access a remote object. Data loader 220 initiates at least one action to execute the operation, and may initiate any of a combination of actions on the various components.

Consider an example where main loop 226 of data loader 220 initiates a method "Operation.execute( )," which is represented by any of the action arrows from main loop 226. Operation.execute( ) is dependent on the operation being initiated. For example, an operation such as StartOperation (SAPInstance) starts an SAPInstance, which could be initiated from main loop 226. In one embodiment, the operation StartOperation(SAPInstance) is contained by another Authorized Operation (which may be referred to as a "function" as used herein), which could, for example, display a Logon Dialog. Thus, multiple operations could be initiated from a single Authorized Operation. In another example of operations, a LoadOperation may simply execute and load the content of the node where the operation is. For example, a LoadOperation(SAPInstance) could be requested and queued just as it is by the data loader, which then asynchronously calls an execute method of the operation, which will consequently load the content of the identified SAPInstance.

Each component described herein may be a means for performing the functions described. Each components described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc. Software content (e.g., data, instructions, configuration) may be provided via an article of manufacture including a machine readable medium, which provides content that represents instructions that can be executed. The content may result in a machine performing various functions/operations described herein. A machine readable medium includes any mechanism that provides (i.e., stores and/or transmits) information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A machine readable medium may also include a storage or database from which content can be downloaded. A machine readable medium may also include a device or product having content stored thereon at a time of sale or delivery. Thus, delivering a device with stored content, or offering content for download over a communication medium may be understood as providing an article of manufacture with such content described herein.

Figure 3:
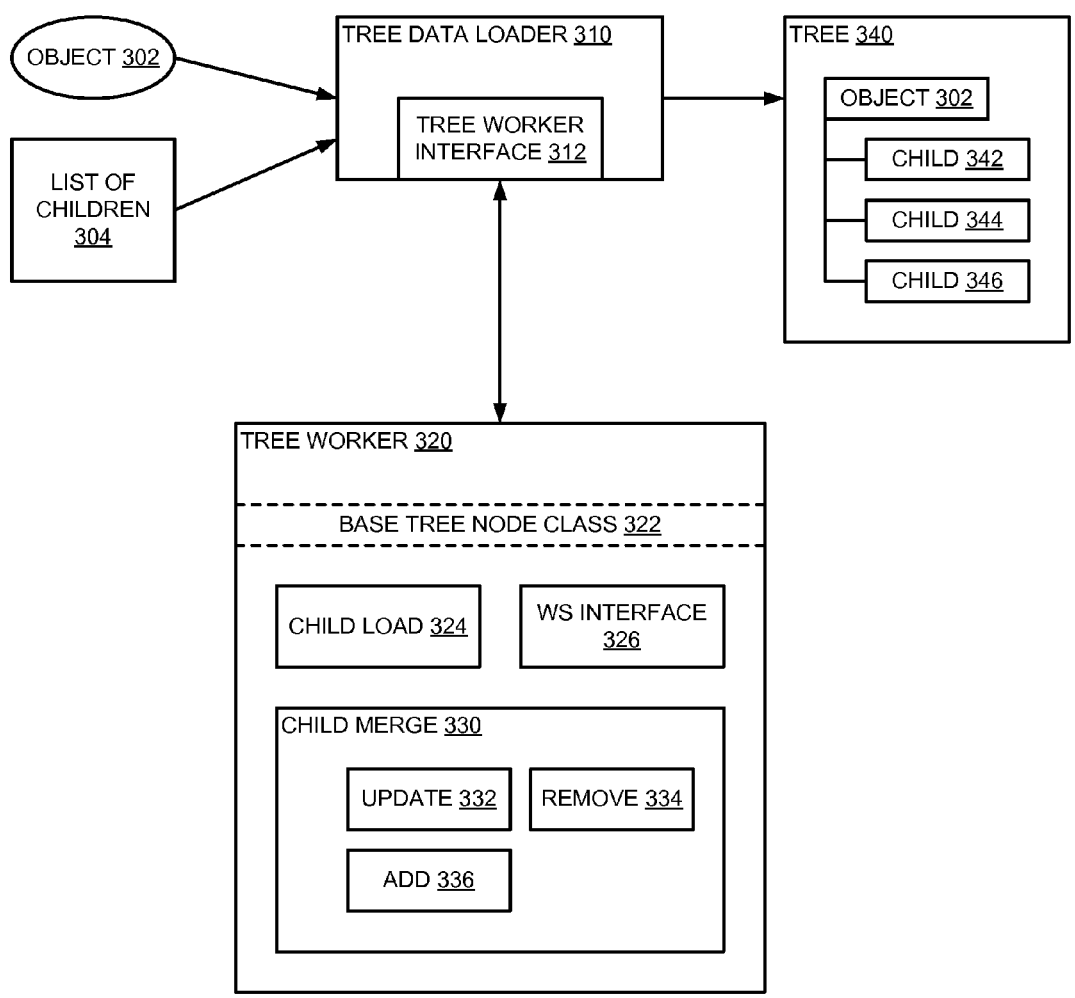
FIG. 3 is a block diagram of an embodiment of a system having a tree data loader and a background thread with a tree worker.

FIG. 3 is a block diagram of an embodiment of a system having a tree data loader and a background thread with a tree worker. System 300 includes tree data loader 310, which accesses and/or instantiates an object tree. Tree data loader 310 executes operations on a data tree in response to a request. In one embodiment, tree data loader 310 receives a request to generate a tree, which may include object 302 and list of children 304. Object 302 can represent an object or an identifier for an object. In one embodiment, a request for a tree as described herein includes object 302, and list of children 304, which provides a list of objects with which object 302 has a relationship. In one embodiment, list of children 304 is obtained from enterprise data. In one embodiment, list of children 304 is provided by a developer.

Tree data loader 310 includes tree worker interface 312, which represents a module or functional component of tree data loader 310. Tree worker interface 312 enables tree data loader 310 to access a tree worker that builds or generates a distributed object tree. In one embodiment, tree worker 320 is included within tree data loader 310. In another embodiment, tree worker 320 operates in conjunction with tree data loader 310, but is separate from tree data loader 310. Operating in conjunction with tree data loader 310 refers to a different module that is called or invoked.

Tree data loader 310 operates on tree 340. In one embodiment, tree data loader 310 invokes or generates tree 340. Tree 340 includes object 302 and children 342-346, which are indicated by list of children 304. Object 302 has relationships with children 342-346, which are depicted in tree 340.

In one embodiment, tree worker 320 represents a type of tree builder that can perform operations on tree 340, and can instantiate tree 340 as well. In one embodiment, tree 340 is an instantiation of base tree node class 322. Tree worker 320 includes several modules or components that can operate on tree 340. For example, child load module 324 enables tree worker 320 to load the child objects indicated in list of children 304. Child load module 324 may include interfaces and methods for network access, remote function calls (RFCs), application programming interfaces (APIs), etc. Web service (WS) interface 326 enables tree worker 320 to access a web service via which information and data object may be accessed.

In one embodiment, tree worker 320 includes child merge 330, which represents one or more modules for operating on tree 340. Instead of having separate modules for update, add, or remove operations, a single merge module can allow for making any of the changes that might be provided by separate modules. Thus, child merge 330 includes functionality (which may be modules within child merge module 330) for various operations. Such operations may include update 332, remove 334, and add 336. Other functionality not shown could be included. Update 332 provides a mechanism to change values, parameters, attributes, etc., of an object within the tree. Remove 334 provides a mechanism to remove one or more children from the tree. Add 336 provides a mechanism to add a child to the tree. In one embodiment, child merge 330 is implemented as a function having a form: merge(ListNew, ListOld), which may take as input an original (old) and updated (new) version of the child list, and make changes accordingly. Thus, according to the form provided above, an add( ) operation can be executed via a merge(list,NULL) call, and a remove operation can be executed via a merge(NULL, list) operation. Change operations would provide show the distinctions in the two lists.

Note that under an MVC framework as discussed above, each operation of child merge 330 can provide information to a publisher that changes a user interface to represent the operation performed. Such operation and user interface updating is asynchronous to a request to perform a function on the tree.

Figure 4:
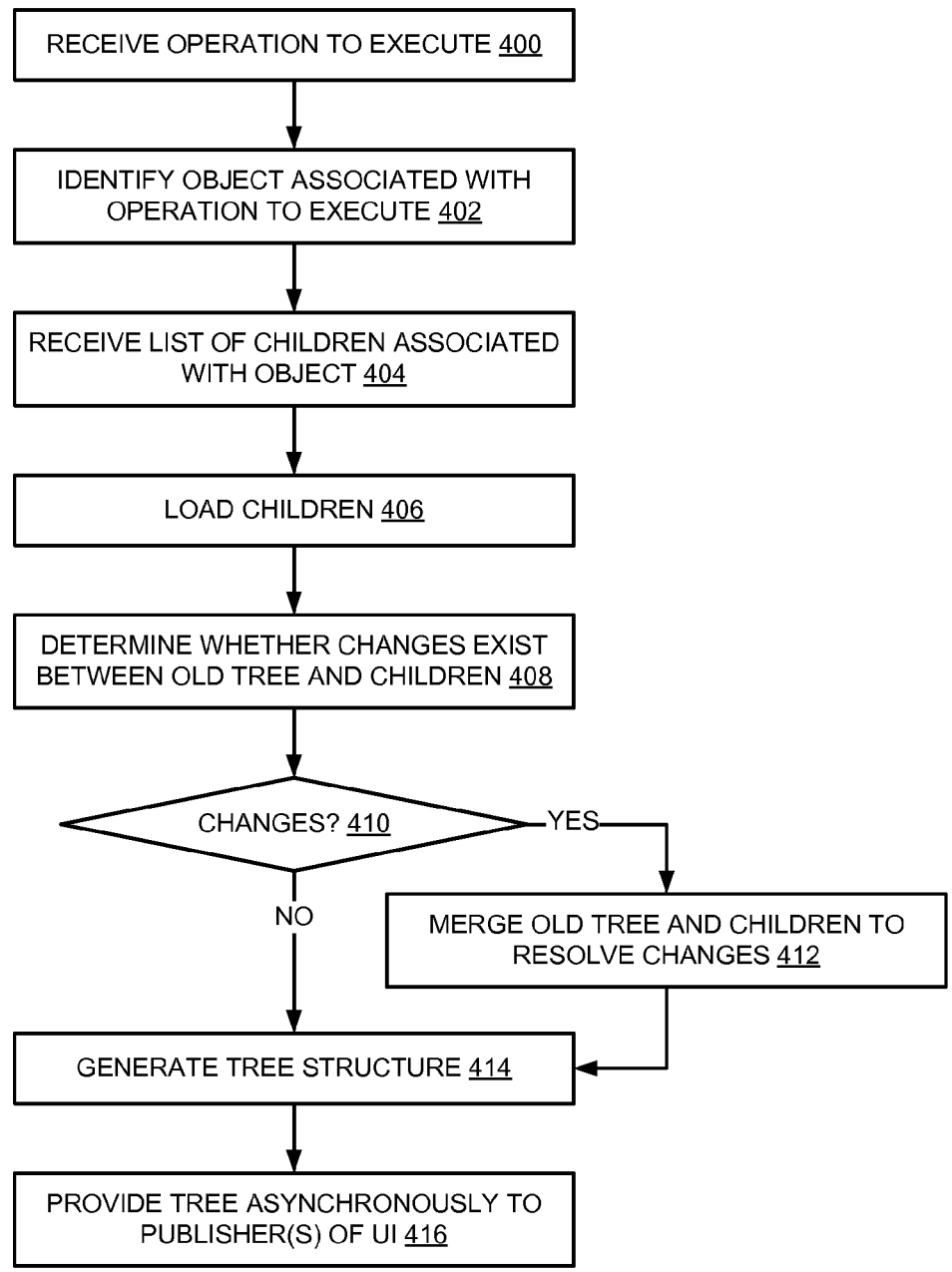
FIG. 4 is a flow diagram of an embodiment of a process for generating a distributed object tree.

FIG. 4 is a flow diagram of an embodiment of a process for generating a distributed object tree. A flow diagram as illustrated herein provides at least one example of sequences of various process actions. Although shown in a particular sequence or order, unless otherwise specified, the order of the actions can be modified. Thus, the illustrated implementation should be understood only as an example, and the process can be performed in a different order, and some actions may be performed in parallel. Additionally, one or more action can be omitted in various embodiments of the invention; thus, not all actions are required in every implementation. Other process flows are possible.

A tree data loader receives and processes a request from a user interface to perform one or more operations on a distributed object tree. After the request is processed, a tree worker receives an operation to execute, 400. The tree worker may in one embodiment include a main loop of execution within the data loader. The tree worker identifies an object associated with the operation to execute, 402, for example, via an indicator in the request to execute the operation. The tree worker may also receive a list of children for the identified object, 404, and subsequently load or access the children, 406. Receiving the list of children can include having the list input as a parameter or sent via a communications link, etc., as well as identifying children of the object via a web service interface, identifying the children via an enterprise database, etc. When the object and the children are loaded, the tree worker determines whether changes exist between a former version (old) of the tree, and the tree as it should be as indicated by the list of children, 408.

If there are changes to be made to the tree, 410, the tree worker merges old tree with the children to resolve any changes, 412. After making necessary changes, the tree worker generates the tree structure, 414, If there are no changes to be made to the tree, 410, the tree worker generates the tree structure without changes, 414. The operation of loading/accessing the tree objects and/or any change operations trigger the tree worker to invoke one or more publisher interfaces to provide the generated tree structure to a remote user interface for rendering by the remote user interface. The tree worker thus provides the tree structure information asynchronously to the publisher(s) of the user interface (UI), 416.

Besides what is described herein, various modifications may be made to the disclosed embodiments and implementations of the invention without departing from their scope. Therefore, the illustrations and examples herein should be construed in an illustrative, and not a restrictive sense. Additional material attached hereto provides further details and more concepts that are part of this disclosure. The scope of the invention can be identified based on the materials herein, as well as the claims that follow.

What is claimed is:

1. In a server, a method comprising:
   receiving, at a synchronous interface of the server, a request from a client computing system to perform an operation with a distributed object, the request including an identifier for the distributed object,
      where interaction with the synchronous interface is prevented until a reply to the request is provided at the synchronous interface, and
      where the distributed object has a plurality of related child objects distributed across one or more servers of an enterprise system, at least one child object stored in a location separate from the distributed object;
   generating a reply at the synchronous interface to release control of the interface prior to completing the requested operation;
   receiving a list of child objects related to the distributed object;
   generating automatically via the server a tree structure instance representing a distributed object tree instance integrating the distributed object and the child objects, in response to receiving the request and the list of child objects,
      where the distributed object tree includes interface functionality for asynchronously updating a visual representation of the objects of the distributed object tree instance responsive to performing the operation at the server with the distributed object tree instance,
      where asynchronously updating the visual representation is asynchronous with respect to the request; and
   providing a result of the operation asynchronously via the interface functionality of the distributed object tree instance to a publisher at the client that provides the result to a graphical user interface (GUI) from which the request was received, the client computing system separate from the server.

2. The method of claim 1, wherein receiving the request comprises:
   receiving the request from an operation request processor that queues multiple requested operations.

3. The method of claim 1, wherein receiving the request comprises:
   receiving a request to perform the operation in a background thread.

4. The method of claim 1, wherein generating the tree structure comprises:
   generating the tree as an instantiation of a tree class.

5. The method of claim 4, wherein generating the tree structure where the distributed object tree includes interface functionality for asynchronously updating the visual representation further comprises:
   the distributed object tree instance inheriting the interface functionality as an instantiation of the tree class.

6. The method of claim 1, wherein generating the tree structure comprises:
   loading the child objects of the distributed object; and
   merging changes to the distributed object with a list that represents data displayed in the UI at the time the function request was generated.

7. The method of claim 6, wherein merging the changes comprises:
   performing one or more of an upgrade operation, a remove operation, an add operation, or a change operation on member of the tree structure.

8. The method of claim 1, wherein generating the tree structure further comprises:
   accessing a web service to access a distributed object of the tree structure.

9. An article of manufacture comprising a machine-readable storage medium having content stored thereon that represents instructions to cause a machine to perform operations including:
   dequeuing an operation for execution from an operation queue that queues operations for execution, the dequeued operation related to an action requested of a server from a synchronous remote interface to be performed on a distributed object, where interaction with the synchronous remote interface is prevented until a reply to an action request is provided at the synchronous remote interface;
   receiving a list of child objects related to the distributed object, where the distributed object has a plurality of related child objects distributed across one or more servers of an enterprise system, at least one child object stored in a location separate from the distributed object;
   generating automatically via the server a distributed object tree instance at the server integrating the distributed object and the child objects in a tree structure representation, in response to dequeuing the operation and receiving the list of child objects,
      where the distributed object tree instance includes interface functionality for asynchronously updating a visual representation of the objects of the distributed object tree instance responsive to executing the operation at the server with the distributed object tree instance,
      where asynchronously updating the visual representation is asynchronous with respect to a request for the action at the synchronous remote interface;
   executing the operation asynchronously with respect to the request for the action from the remote interface; and
   providing a result of the operation asynchronously via the interface functionality of the distributed object tree instance to a publisher at the client that provides the result to a graphical user interface (GUI) of a computing system from which the request was received, the computing system separate from the server.

10. The article of manufacture of claim 9, wherein the content for receiving the list of child objects further comprises content for
    identifying child objects of the distributed object via a web service interface.

11. The article of manufacture of claim 9, wherein the content for receiving the list of child objects further comprises content for
    identifying child objects of the distributed object via an enterprise database.

12. The article of manufacture of claim 9, wherein the content for generating the distributed object tree comprises content for
    instantiating a distributed object tree class with the distributed object and the child objects as elements of the distributed object tree instance.

13. The article of manufacture of claim 9, further comprising content for:
    executing changes to a current representation of the distributed object tree instance via a merge operation.

14. An enterprise server comprising:
    a memory to store a distributed object of a distributed object tree, where the distributed object has a plurality of related child objects distributed across one or more enterprise servers of an enterprise system, at least one child object stored in a memory separate from the distributed object;

a data loader to receive, at a synchronous interface, a request to perform a function on the distributed object, where interaction with the synchronous interface is prevented until a reply to the request is provided at the synchronous interface, generate a reply at the synchronous interface to release control of the interface prior to completing the requested function, and receive a list of child objects related to the distributed object; and a tree builder module coupled to the data loader to receive from the data loader an identifier indicating the distributed object and the list of child objects, and generate automatically an instance of the distributed object tree in response to receiving the identifier and the list of child objects, including instantiating the distributed object tree instance as a member of a distributed object tree class having the distributed object and the child objects;

the distributed object tree instance to include interface functionality for asynchronously updating a visual representation of the objects of the distributed object tree instance responsive to performing the function, and provide a result of the function asynchronously via the interface functionality to a publisher to provide the result to a graphical user interface (GUI) of a computing system from which the request was received, the computing system separate from the enterprise server, where asynchronously updating the visual representation is asynchronous with respect to the request.

15. The enterprise server of claim 14, the tree builder module further comprising:

a child merge module to merge changes to a distributed object with a current representation of the distributed object tree structure.

16. The enterprise server of claim 15, the child merge module further comprising:

an update module to update changes to an attribute of a distributed object of the distributed object tree structure.

17. The enterprise server of claim 15, the child merge module further comprising:

an add module to add a distributed object to the distributed object tree structure.

18. The enterprise server of claim 15, the child merge module further comprising:

a remove module to delete a distributed object from the distributed object tree structure.

* * * * *